(12) United States Patent
Kamps (10) Patent No.: US 7,707,928 B1
(45) Date of Patent: May 4, 2010

(54) VERTICAL ROTISSERIE SUB-ASSEMBLY

(76) Inventor: Robert A. Kamps, 8475 S. Maple Ct., Zeeland, MI (US) 49464

( * ) Notice: Subject to any disclaimer, the term of this patent is extended or adjusted under 35 U.S.C. 154(b) by 1026 days.

(21) Appl. No.: 11/316,229

(22) Filed: Dec. 22, 2005

(51) Int. Cl.
*A47J 37/00* (2006.01)

(52) U.S. Cl. .............................. 99/339; 99/340; 99/449; 99/450; 126/30; 126/25 AA (58) Field of Classification Search .......... 99/326–333, 99/339, 340, 348, 444–450, 481, 482, 419–421 V; 126/30, 25 R, 9 R, 41 R, 25 AA
See application file for complete search history.

(56) References Cited

U.S. PATENT DOCUMENTS

| | | | | |
|---|---|---|---|---|
| 4,732,138 A | * | 3/1988 | Vos ........................... | 126/25 A |
| 5,025,715 A | * | 6/1991 | Sir ........................... | 99/421 HV |
| 5,297,534 A | * | 3/1994 | Louden ...................... | 126/30 |
| 5,908,026 A | * | 6/1999 | Forst ...................... | 126/25 AA |

\* cited by examiner

*Primary Examiner*—Timothy F. Simone
(74) *Attorney, Agent, or Firm*—King & Partners, PLC (57) ABSTRACT

A vertical rotisserie sub-assembly, comprising: (a) a housing; (b) a motor; (c) an energy source; (d) a switch; (e) a rotating member; (f) a lower suspending member; and (g) an upper suspending member.

20 Claims, 10 Drawing Sheets

VERTICAL ROTISSERIE SUB-ASSEMBLY

BACKGROUND OF THE INVENTION

1. Field of the Invention

The present invention relates in general to a vertical rotisserie sub-assembly, and more particularly, to a vertical rotisserie sub-assembly which facilitates substantially more uniform heating when associated with conventional grill assemblies.

2. Background Art

Cooking grills and grill assemblies have been known in the art for several years, and may include charcoal grills, gas grills, grill assemblies positioned over an open fire, such as a campfire, etcetera. Typically, cooking grills and grill assemblies are utilized for cooking food, such as meat, vegetables, bread, etcetera, while outdoors. Individuals may use such cooking grills and grill assemblies at home or during travel, camping, or outdoor barbecues in order to enjoy a unique cooking experience and the distinctive flavor of grilled food. However, a plurality of drawbacks and/or deficiencies are associated with conventional cooking grills and grill assemblies.

In normal operation of conventional cooking grills and grill assemblies, food is placed on a cooking grid and is cooked while in a stationary position over a fire or heating element. However, conventional cooking grills and grill assemblies typically have uneven heating associated with them inasmuch as the fire or heating element below the cooking grid may be more or less intense in some areas. For example, hot and cold spots are often present on the cooking grid of a cooking grill or grill assembly, which leads to food being either undercooked or over-cooked. Therefore, in order to remedy the uneven heating associated with conventional cooking grills and grill assemblies, a vertical rotisserie sub-assembly which facilitates substantially more uniform heating of food when associated with conventional cooking grills and grill assemblies is highly desirable.

In addition, cooking grills and grill assemblies are often placed outside and are therefore subject to a variety of weather conditions and the decline, decay, and/or deterioration that may naturally result. Therefore, a vertical rotisserie sub-assembly which can easily be removed from an outdoor cooking grill or grill assembly is highly desirous.

Furthermore, individuals who enjoy grilled food often enjoy grilling on a variety of types of grills, including charcoal grills, gas grills, or grill assemblies positioned over an open fire, such as a campfire. Accordingly, it is an object of the present invention to provide a vertical rotisserie sub-assembly which can be easily modified for association with any one of a variety of types of cooking grills or grill assemblies.

Accordingly, it is an object of the present invention to overcome the deficiencies of the prior art and to satisfy the commercial demand for a vertical rotisserie sub-assembly which facilitates substantially more uniform heating when associated with conventional grill assemblies.

These and other objects of the present invention will become apparent in light of the present specification, claims, and drawings.

SUMMARY OF THE INVENTION

The present invention is directed to a vertical rotisserie sub-assembly, comprising; (a) a housing, wherein the housing comprises: (1) a first surface, wherein the first surface comprises an aperture; (2) a second surface; (3) at least one sidewall; and (4) an internal chamber defined by the first surface, the second surface, and the at least one sidewall of the housing; (b) a motor, wherein the motor is contained within the internal chamber of the housing; (c) an energy source, wherein the energy source is contained within the internal chamber of the housing, and wherein the energy source provides energy to the motor; (d) a switch, wherein the switch is at least partially contained within the internal chamber of the housing, and further wherein the switch is in electrical communication with at least one of the motor and the energy source; (e) a rotating member, wherein the rotating member is at least partially contained within the internal chamber of the housing, and wherein the rotating member is in mechanical communication with the motor, and further wherein the rotating member comprises a slot; (f) a lower suspending member, wherein the lower suspending member is capable of suspending a cooking grid below the first surface of the housing, and wherein the lower suspending member comprises: (1) a stem, wherein the stem of the lower suspending member is secured within the slot of the rotating member and the aperture of the first surface of the housing; and (2) a lower fastener; and (g) an upper suspending member, wherein the upper suspending member is capable of suspending the housing below a grill assembly, and wherein the upper suspending member comprises: (1) a bracket member, wherein the bracket member of the upper suspending member is secured to the second surface of the housing; and (2) an upper fastener.

In a preferred embodiment of the present invention, the second surface of the housing comprises at least two apertures, and the bracket member comprises a C-shaped bracket and at least two fasteners releasably secured within the at least two apertures of the second surface of the housing.

In another preferred embodiment of the present invention, the housing comprises four sidewalls.

In yet another preferred embodiment of the present invention, at least a portion of the switch is positioned on one of the first surface, the second surface, and the at least one sidewall.

Preferably, at least one of the lower fastener and the upper fastener comprises an eyebolt.

It is also preferred that the stem comprises a non-circular outer peripheral geometry.

In a preferred embodiment of the present invention, the stem of the lower suspending member is releasably secured within the slot of the rotating member and the aperture of the first surface of the housing.

In another preferred embodiment of the present invention, the vertical rotisserie sub-assembly further comprises a grill assembly, wherein the grill assembly comprises: (a) a multi-pod, wherein the multi-pod comprises at least two ground engaging legs; (b) a pod directing bracket, wherein the pod directing bracket comprises at least two apertures for receiving the at least two ground engaging legs of the multi-pod therein; (c) a cooking grid, wherein the cooking grid comprises at least two positions; (d) an upper linking member, wherein the upper linking member comprises an upper end and a lower end, and wherein the upper end of the upper linking member is secured to the pod directing bracket and the lower end of the upper linking member is secured to the upper fastener of the upper suspending member; and (e) a lower linking member, wherein the lower linking member comprises an upper end and a lower end, and wherein the upper end of the lower linking member is secured to the lower fastener of the lower suspending member and the lower end of the lower linking member is secured to the at least two positions of the cooking grid.

In this embodiment, it is preferred that the multi-pod comprises at least three ground engaging legs, and wherein the pod directing bracket comprises at least three apertures for receiving the at least three ground engaging legs of the multipod therein.

In this embodiment, it is also preferred that the cooking grid comprises at least three positions, and wherein the lower end of the lower linking member is secured to the at least three positions of the cooking grid.

The present invention is also directed to a vertical rotisserie sub-assembly, comprising; (a) a housing, wherein the housing comprises: (1) a first surface, wherein the first surface comprises an aperture and at least one mounting slot; (2) a second surface; (3) at least one sidewall; and (4) an internal chamber defined by the first surface, the second surface, and the at least one sidewall of the housing; (b) a mounting bracket, wherein the mounting bracket is secured within the at least one mounting slot of the first surface of the housing, and further wherein the mounting bracket is securable to a grill assembly to, in turn, secure the housing thereto; (c) a motor, wherein the motor is contained within the internal chamber of the housing; (d) an energy source, wherein the energy source is contained within the internal chamber of the housing, and wherein the energy source provides energy to the motor; (e) a switch, wherein the switch is at least partially contained within the internal chamber of the housing, and further wherein the switch is in electrical communication with at least one of the motor and the energy source; (f) a rotating member, wherein the rotating member is at least partially contained within the internal chamber of the housing, and wherein the rotating member is in mechanical communication with the motor, and further wherein the rotating member comprises a slot; (g) a stem, wherein the stem comprises an upper end and a lower end, and wherein the lower end of the stem is secured within the slot of the rotating member and the aperture of the first surface of the housing; and (h) a cooking grid adapter, wherein the cooking grid adapter comprises at least one channel for receiving a portion of a cooking grid therein, and wherein the cooking grid adapter is secured to the upper end of the stem.

In a preferred embodiment of the present invention, the housing comprises four sidewalls.

In another preferred embodiment of the present invention, at least a portion of the switch is positioned on one of the first surface, the second surface, and the at least one sidewall.

In yet another preferred embodiment of the present invention, the stem comprises a non-circular outer peripheral geometry.

In a further preferred embodiment of the present invention, the lower end of the stem is releasably secured within the slot of the rotating member and the aperture of the second surface of the housing.

It is also preferred that the cooking grid adapter comprises a slot for receiving the upper end of the stem to, in turn, releasably secure the cooking grid adapter to the upper end of the stem.

In a preferred embodiment of the present invention, the cooking grid adapter comprises at least two channels for receiving a portion of a cooking grid therein.

In this embodiment, preferably, at least two of the at least two channels of the cooking grid adapter are substantially perpendicular to each other.

Preferably, the vertical rotisserie sub-assembly further comprises a grill assembly, wherein the grill assembly comprises: (a) a grill body, wherein the grill body comprises: (1) an inner surface; (2) an outer surface, wherein the outer surface of the grill body is secured to the mounting bracket of the vertical rotisserie sub-assembly; (3) an open fire chamber defined by the inner surface of the grill body; and (4) at least one slot extending through the inner surface and the outer surface of the grill body; (b) at least two ground engaging legs, wherein the at least two ground engaging legs are secured to the outer surface of the grill body; and (c) a cooking grid, wherein the cooking grid is secured to the inner surface of the grill body, and wherein the cooking grid is at least partially contained within the open fire chamber.

In this embodiment, it is preferred that the at least two ground engaging legs comprise at least three ground engaging legs.

BRIEF DESCRIPTION OF THE DRAWINGS

The invention will now be described with reference to the drawings wherein.

DETAILED DESCRIPTION OF THE INVENTION

While this invention is susceptible of embodiment in many different forms, there is shown in the drawings and will herein be described in detail a specific embodiment with the understanding that the present disclosure is to be considered as an exemplification of the principles of the invention and is not intended to limit the invention to the embodiment illustrated.

Figure 1:
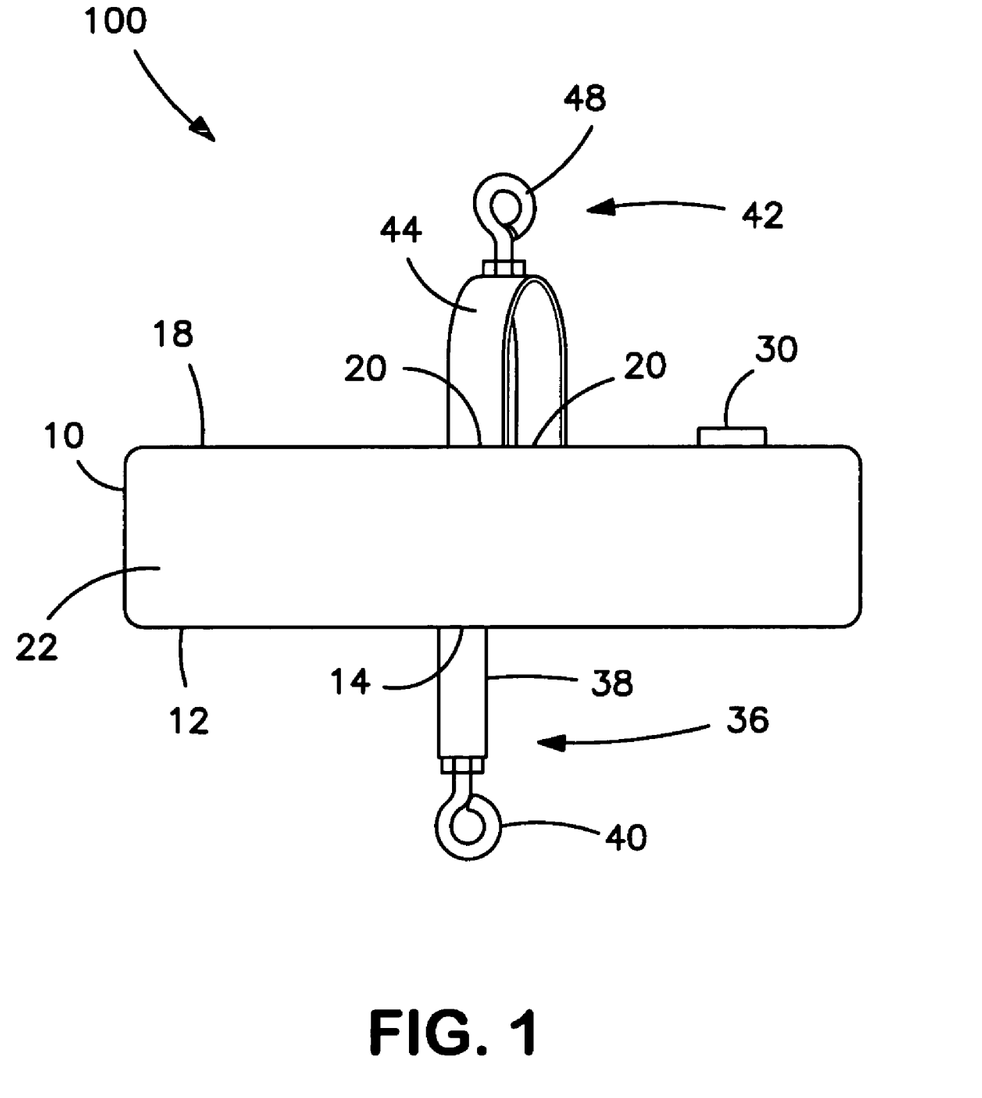
FIG. 1 of the drawings is a side perspective view of an embodiment of a vertical rotisserie sub-assembly showing, among other things, a lower suspending member and an upper suspending member, fabricated in accordance with the present invention.
Figure 2:
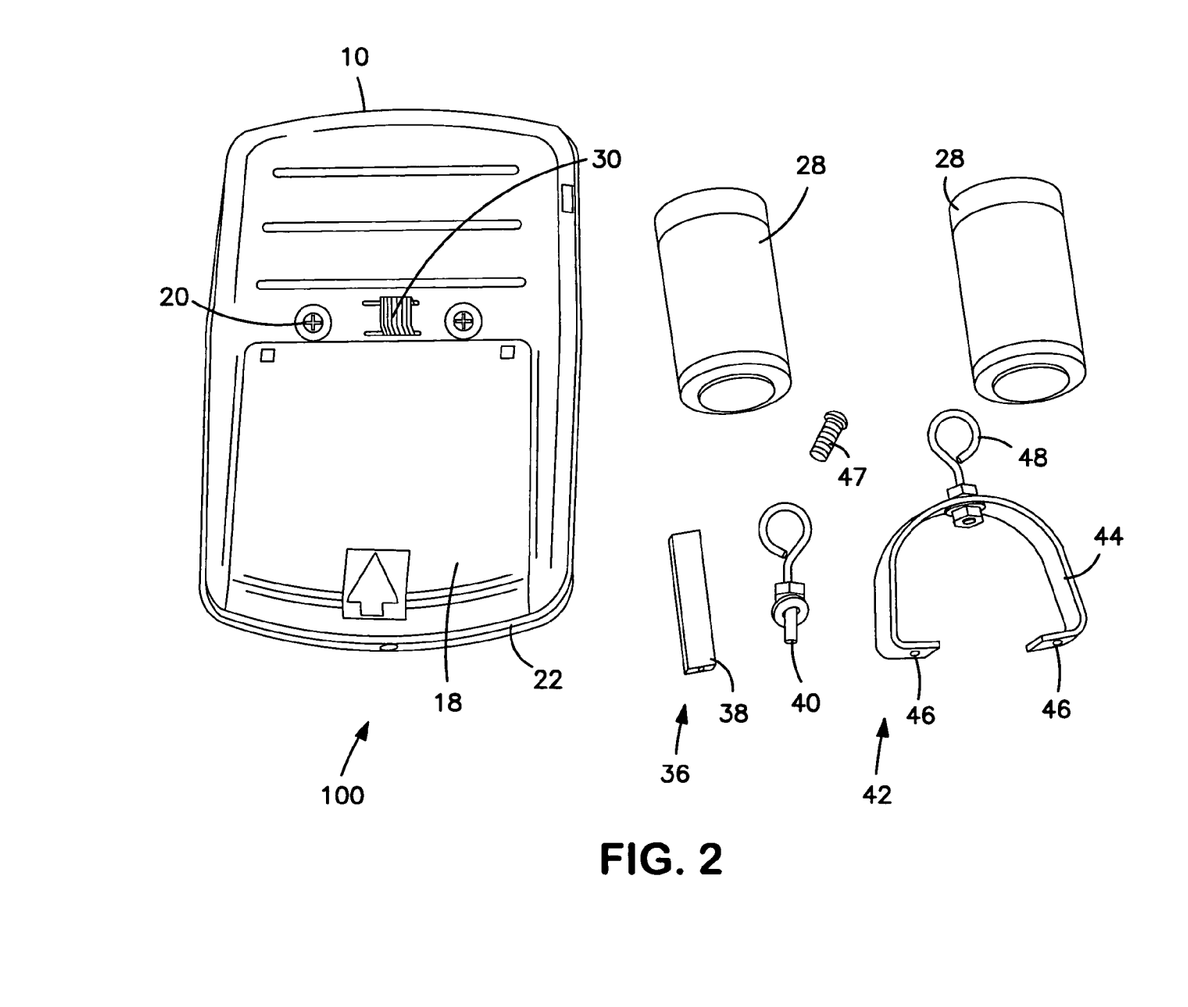
FIG. 2 of the drawings is a fragmented, top perspective view of an embodiment of a vertical rotisserie sub-assembly, fabricated in accordance with the present invention.
Figure 3:
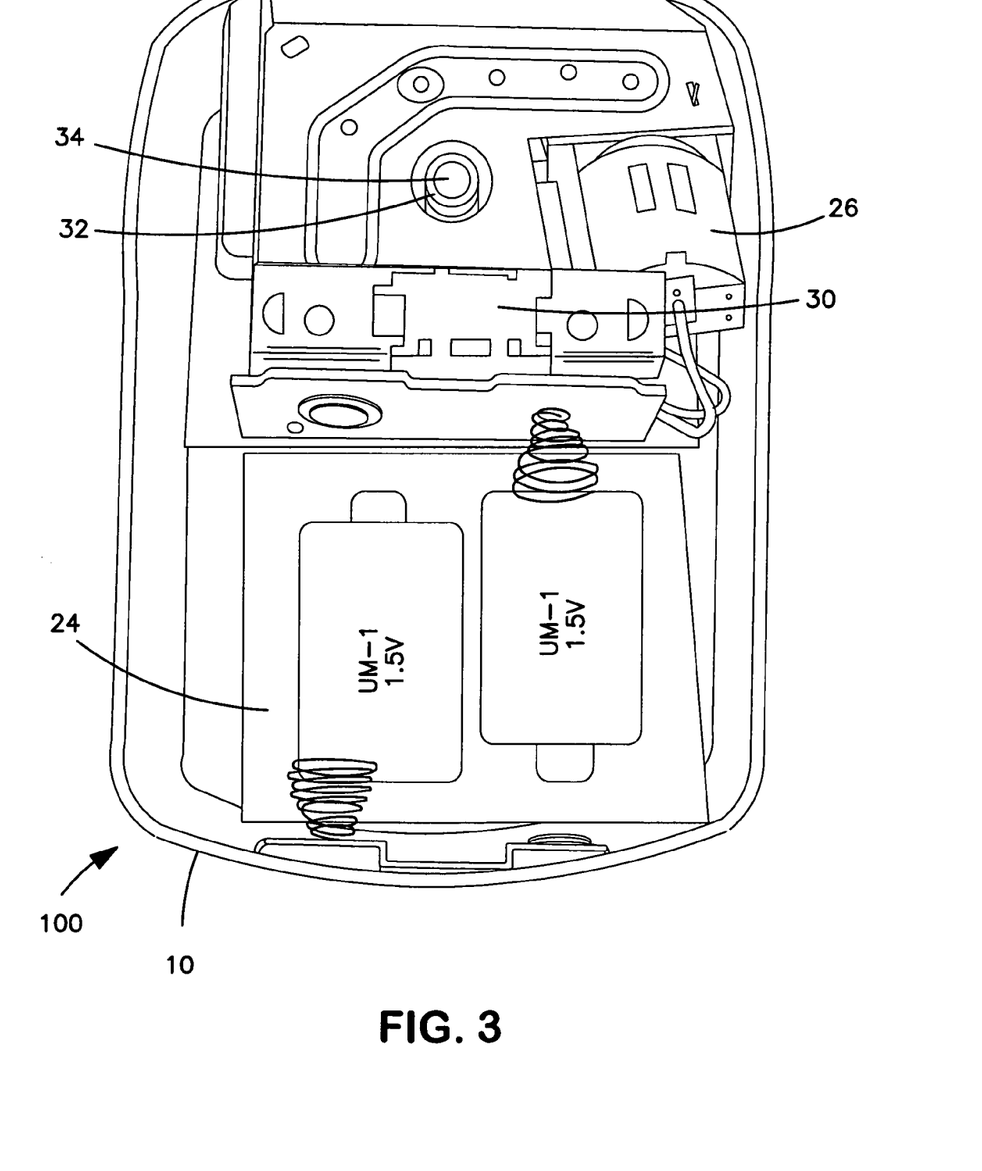
FIG. 3 of the drawings is a top perspective view of an embodiment of a vertical rotisserie sub-assembly showing, among other things, an internal chamber of a housing, fabricated in accordance with the present invention.

Referring now to the drawings and to FIGS. 1-3 in particular, perspective views of vertical rotisserie sub-assembly 100 are shown, which generally comprises housing 10, internal chamber 24, motor 26, energy source 28, switch 30, rotating member 32, lower suspending member 36, and upper suspending member 42. It will be understood that FIGS. 1 through 10 are merely schematic representations of vertical rotisserie sub-assembly 100. As such, some of the components may have been distorted from their actual scale for pictorial clarity.

Housing 10 includes first surface 12, second surface 18, and at least one sidewall 22. As is shown in the figures, housing 10 may comprise a substantially rectangular, three-dimensional shape. However, it will be understood that housing 10 may comprise any one of a number of different shapes, including, but not limited to, substantially triangular, substantially square, substantially polygonal, substantially round or oblong, or substantially arbitrary. Housing 10 may be fabricated from any one of a number of materials including numerous metals and alloys, natural or synthetic plastics, woods, combinations of the same, etcetera, with the only limitation being that housing 10 be fabricated from a substantially heat-resistant material inasmuch as, in operation, housing 10 is positioned near a fire or heating element.

First surface 12 of housing 10 is shown in FIGS. 1 and 6-8, among others, as generally comprising aperture 14 and, preferably, at least one mounting slot 16. As is shown in the figures, it is preferred that first surface 12 of housing 10 comprises two mounting slots 16, however, it is also contemplated that no mounting slots 16 are associated with first surface 12 of housing 10. Furthermore, first surface 12 of housing 10 may comprise a substantially flat or non-flat surface, and, depending on the particular application of vertical rotisserie sub-assembly 100, in operation, first surface 12 of housing 10 may be upward-facing or downward-facing.

Second surface 18 is shown in FIGS. 1 and 2, among others, as preferably comprising two apertures 20 for releasable securement to a bracket member via bracket fasteners. However, it is also contemplated that second surface 18 comprise any number of apertures 20, or no apertures 20 if a bracket member is not present or is secured by another means. Furthermore, second surface 18 of housing 10 may comprise a substantially flat or non-flat surface, and, depending on the particular application of vertical rotisserie sub-assembly 100, in operation, second surface 18 of housing 10 may be upward-facing or downward-facing.

Preferably, at least one sidewall 22 of housing 10 comprises four sidewalls 22, as is shown collectively in the figures. However, inasmuch as housing 10 may comprise any one of a number of different shapes, and the shape of housing 10 is substantially determined by the number of sidewalls 22, it will be understood that housing 10 may comprise any number of sidewalls 22.

Internal chamber 24 of housing 10 is shown generally in FIG. 3, among others. Internal chamber 24 is defined by first surface 12, second surface 18, and at least one sidewall 22 of housing 10. Internal chamber 24 is configured to contain motor 26, energy source 28, at least a portion of switch 30, and rotating member 32.

As is shown in FIG. 3, among others, motor 26 is contained within internal chamber 24 of housing 10 and may comprise any one of a number of different types of motors known to those with ordinary skill in the art, as long as motor 26 is capable of mechanical communication with rotating member 32 to, in turn, actuate rotation of rotating member 32.

Energy source 28 comprises a power source, such as, for example, a primary/secondary or non-rechargeable/rechargeable battery (i.e., NiCad, NIMH, Li-ion, etcetera), or any other self-contained energy source known to those with ordinary skill in the art. Of course, it is also contemplated that energy source 28 comprises a connection to an outside AC source (i.e., city power supply). However, for typical, outdoor applications of vertical rotisserie sub-assembly 100, it is preferred that energy source 28 comprise a self-contained power source. Energy source 28 is contained within internal chamber 24 of housing 10 and provides energy to motor 26.

Switch 30 of vertical rotisserie sub-assembly 100 can be seen in FIG. 3, among others, as being at least partially contained within internal chamber 24 of housing 10. Switch 30 is in electrical communication with at least one of motor 26 and energy source 28. At least a portion of switch 30 may be positioned on one of first surface 12, second surface 18, and/or at least one sidewall 22 of housing 10. As such, a user can easily manipulate switch 30 in order to actuate and de-actuate at least one of motor 26 and energy source 28 which, in turn, actuates rotation of rotating member 32. Switch 30 may be fabricated from any one of a number of materials including numerous metals and alloys, natural or synthetic plastics, woods, combinations of the same, etcetera, but should be at least partially heat resistant. It will be understood that, regardless of its ordinary meaning, that the term "switch" will be defined herein as a member capable of activating and/or de-activating motor 26 and/or energy source 28.

FIG. 3, among others, shows rotating member 32 as being at least partially contained within internal chamber 24 of housing 10 and as comprising slot 34 therein. Slot 34 is configured to receive a stem of lower suspending member 36. Preferably, at least a portion of slot 34 comprises a non-circular cross-section such as, for example, a substantially rectangular, substantially polygonal, substantially square, substantially oval, or substantially arbitrary cross-section. Rotating member 32 is in mechanical communication with motor 26 such that motor 26 actuates rotation of rotating member 32. Preferably, rotating member 32 rotates in a substantially horizontal orientation relative to the ground. It is also preferred that rotating member 32 rotates at a substantially constant speed. However, it is also contemplated that rotating member 32 can be programmed to rotate at a plurality of different speeds, wherein the speed may vary. Rotating member 32 may be fabricated from any one of a number of materials including numerous metals and alloys, natural or synthetic plastics, woods, combinations of the same, etcetera, but should be at least partially heat resistant.

As can be seen in FIGS. 1, 2, 4, and 5, among others, lower suspending member 36 is configured to substantially suspend a cooking grid below first surface 12 of housing 10 and generally comprises stem 38 and lower fastener 40. While stem 38 and lower fastener 40 are shown as comprising separate members comprising the same or different materials which are fused, welded, fastened, or otherwise attached, it will be understood that a unitary member is also contemplated for lower suspending member 36. Lower suspending member 36, including stem 38 and lower fastener 40, may be fabricated from any one of a number of materials including numerous metals and alloys, natural or synthetic plastics, woods, combinations of the same, etcetera, but should be at least partially heat resistant.

Figure 6:
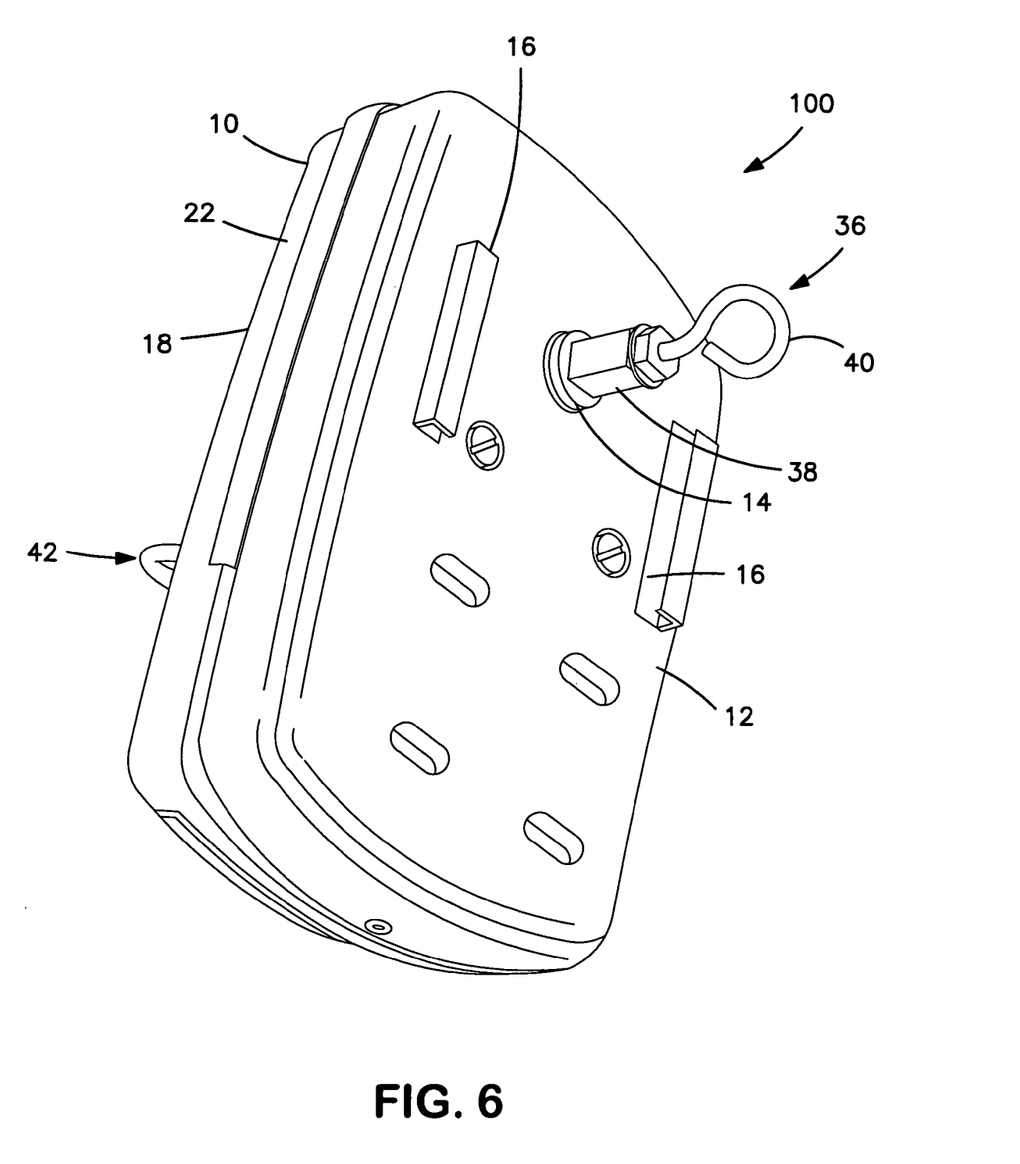
FIG. 6 of the drawings is a bottom perspective view of an embodiment of a vertical rotisserie sub-assembly fabricated in accordance with the present invention.
Figure 7:
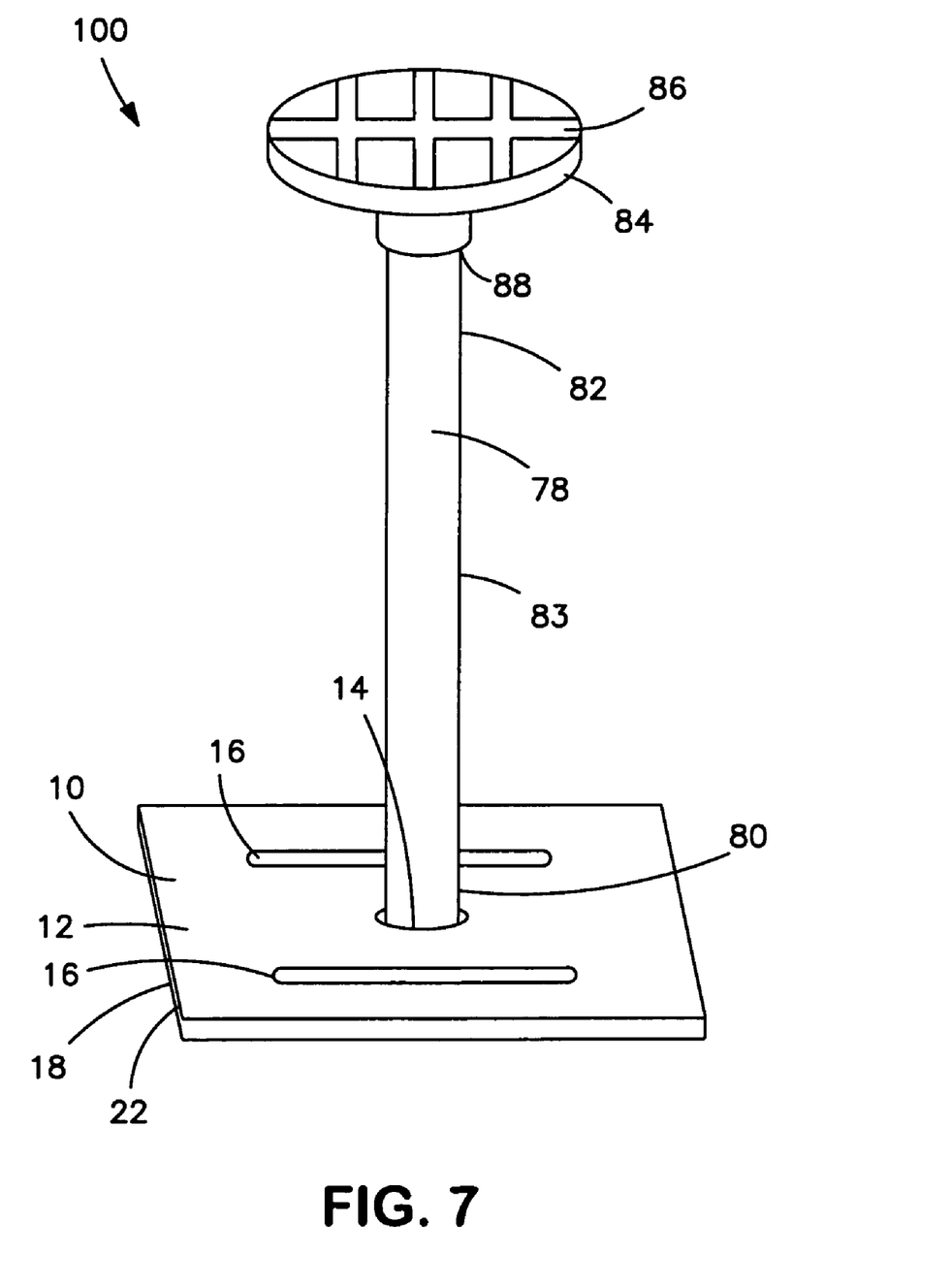
FIG. 7 of the drawings is a top perspective view of an embodiment of a vertical rotisserie sub-assembly showing, among other things, a stem and a cooking grid adapter, fabricated in accordance with the present invention.
Figure 8:
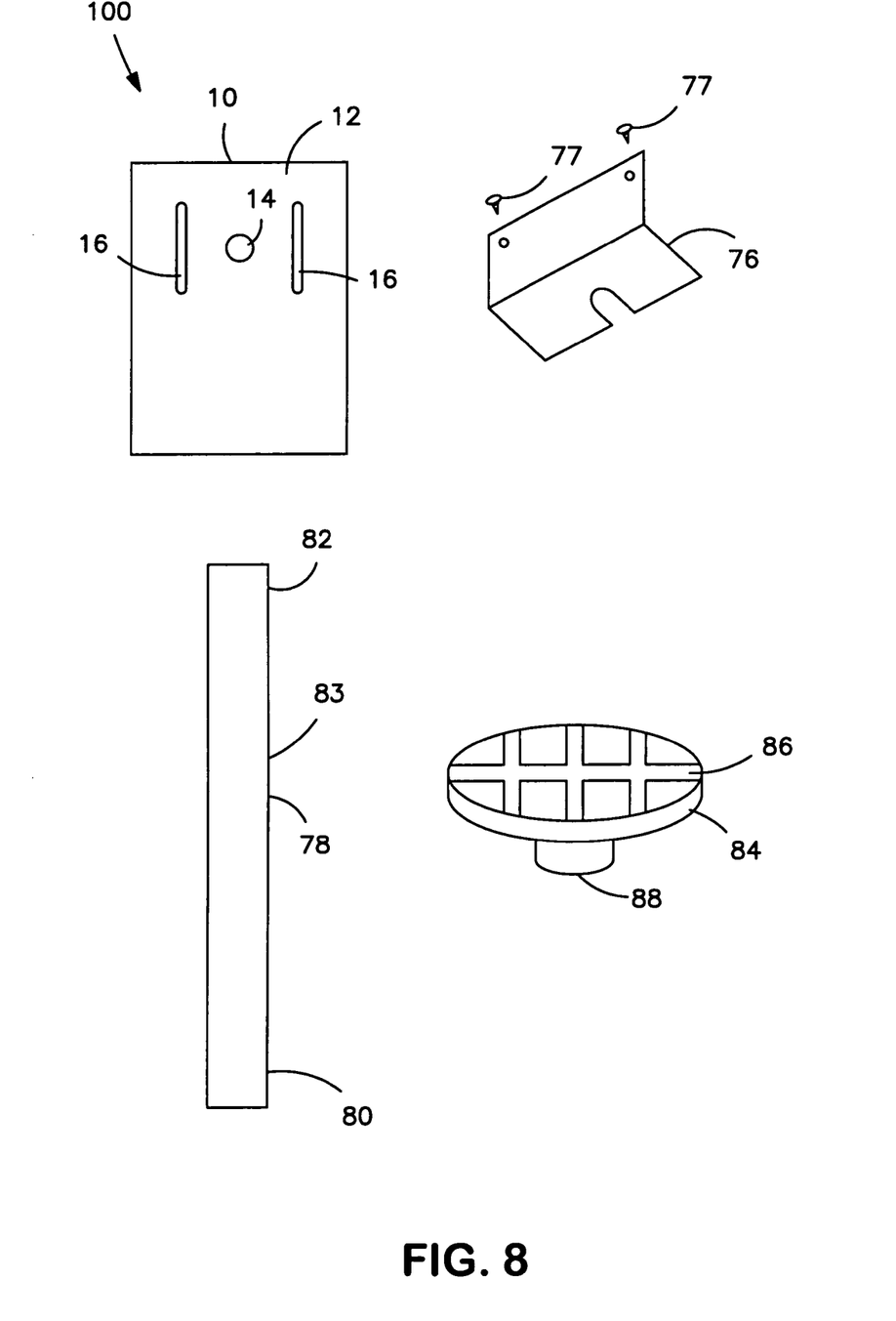
FIG. 8 of the drawings is a fragmented, top perspective view of an embodiment of a vertical rotisserie sub-assembly fabricated in accordance with the present invention.

Stem 38 is shown in FIGS. 1, 2, and 6, among others, as being secured within slot 34 of rotating member 32 and aperture 14 of first surface 12 of housing 10. Preferably, at least a portion of an outer peripheral geometry of stem 38 is non-circular and may preferably comprise, for example, a substantially rectangular, substantially polygonal, substantially square, substantially oval, or substantially arbitrary outer peripheral geometry. It will be understood that the exact configuration of stem 38 is not critical, as long as stem 38 is able to be rotated by rotating member 32 while secured in slot 34. Stem 38 is preferably releasably secured within slot 34 of rotating member 32 and aperture 14 of first surface 12 of housing 10 by a buttonhead bolt, however other means of securing are also contemplated, such as, but not limited to, welding, fusing, threaded and non-threaded fasteners, rivets, various tapes, and adhesives—just to name a few.

Lower fastener 40 may comprise any fastener known to those having ordinary skill in the art which is capable of fastening to stem 38 and suspending a cooking grid therebelow. As is shown in FIGS. 1, 2, and 6, among others, preferably, lower fastener 40 comprises an eyebolt.

As can be seen in FIGS. 1, 2, 4, and 5, among others, upper suspending member 42 is configured to substantially suspend housing 10 below a grill assembly and generally comprises bracket member 44 and upper fastener 48. While bracket member 44 and upper fastener 48 are shown as comprising separate members comprising the same or different materials which are fused, welded, fastened, or otherwise attached, it will be understood that a unitary member is also contemplated for upper suspending member 42. Upper suspending member 42, including bracket member 44 and upper fastener 48, may be fabricated from any one of a number of materials including numerous metals and alloys, natural or synthetic plastics, woods, combinations of the same, etcetera, but should be at least partially heat resistant.

Bracket member 44 is shown in FIGS. 1, 2, 4, and 5, among others, as being secured to second surface 18 of housing 10. Although not shown, it is also contemplated that bracket member 44 be secured to at least one sidewall 22, alternatively. Preferably, bracket member 44 comprises a C-shaped bracket having at least two bracket apertures 46 and at least two bracket fasteners 47, wherein bracket member 44 is releasably securable to housing 10 via at least two bracket fasteners 47 secured within at least two bracket apertures 46 and at least two apertures 20 of second surface 18 of housing 10. However, bracket member 44 may comprise any configuration and securing means to housing 10, including, but not limited to, welding, fusing, threaded and non-threaded fasteners, rivets, various tapes, and adhesives—just to name a few.

Upper fastener 48 may comprise any fastener known to those having ordinary skill in the art which is capable of fastening to bracket member 44 and suspending housing 10 below a grill assembly. As is shown in FIGS. 1, 2, and 5, among others, preferably, upper fastener 40 comprises an eyebolt.

Figure 4:
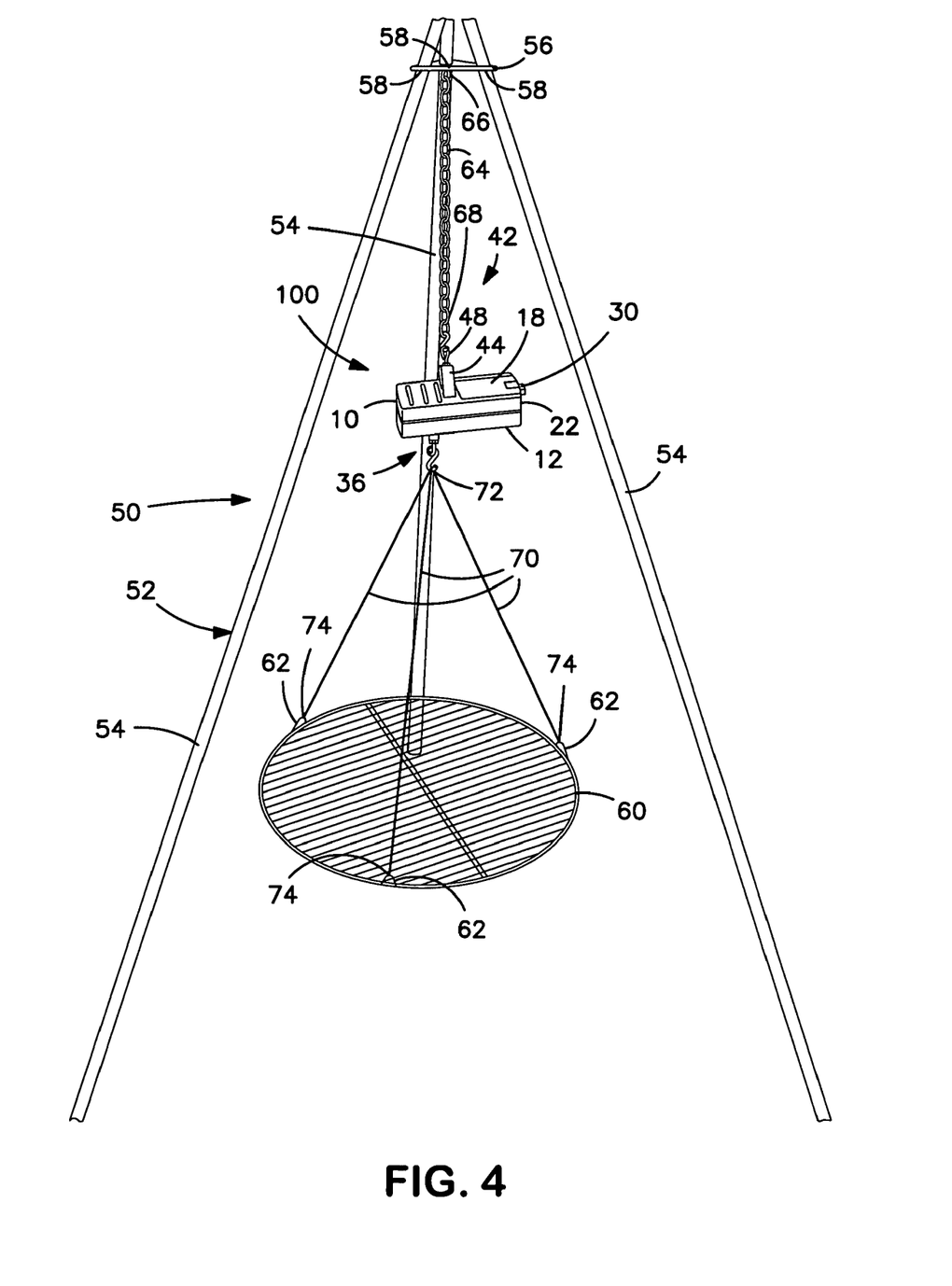
FIG. 4 of the drawings is a top perspective view of an embodiment of a vertical rotisserie sub-assembly showing, among other things, a lower linking member of a grill assembly secured to at least three positions of a cooking grid, fabricated in accordance with the present invention.
Figure 5:
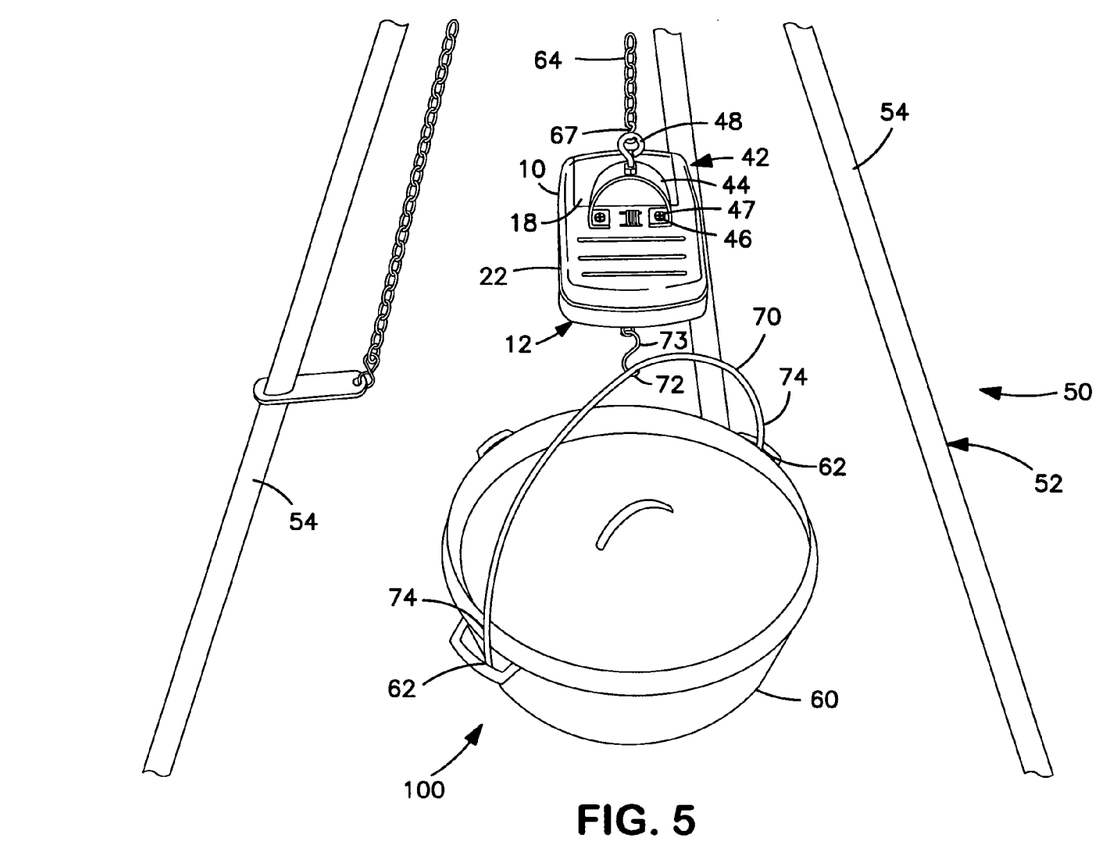
FIG. 5 of the drawings is a top perspective view of an embodiment of a vertical rotisserie sub-assembly showing, among other things, a lower linking member of a grill assembly secured to at least two positions of a cooking grid, fabricated in accordance with the present invention.

As can be seen in FIGS. 4 and 5, among others, vertical rotisserie sub-assembly 100 may further comprise grill assembly 50 comprising multi-pod 52, pod directing bracket 56, cooking grid 60, upper linking member 64, and lower linking member 70. While grill assembly 50 is shown as comprising separate members comprising the same or different materials which are fused, welded, fastened, or otherwise attached, it will be understood that a unitary member is also contemplated for grill assembly 50. In addition, grill assembly 50, as well as its members, may be fabricated from any one of a number of materials including numerous metals and alloys, natural or synthetic plastics, woods, combinations of the same, etcetera, but should be at least partially heat resistant.

Multi-pod 52 comprises at least two ground engaging legs 54. Preferably, multi-pod 52 comprises three ground engaging legs 54, as is shown in FIGS. 4 and 5, however, any number of ground engaging legs 54 are contemplated for use with grill assembly 50, as long as multi-pod 52 can be positioned over a fire, such as a campfire, or other heating source. In addition, at least two ground engaging legs 54 may be associated with wheels.

Pod directing bracket 56 is configured to secure upper suspending member 42 of vertical rotisserie sub-assembly 100 to multi-pod 52 of grill assembly 50. Although any securing means known to those with ordinary skill in the art are contemplated, preferably, pod directing bracket 56 comprises at least two apertures 58 for receiving at least two ground engaging legs 54 of multi-pod 52. Pod directing bracket 56 is thereby secured to multi-pod 52 by positioning at least two ground engaging legs 54 through at least two apertures 58 in order for pod directing bracket 56 to substantially rest on multi-pod 52. In a preferred embodiment wherein multi-pod 52 comprises at least three ground engaging legs 54, pod directing bracket 56 comprises at least three apertures 58.

Cooking grid 60 comprises at least two positions 62 and is configured for retaining food items, such as meat, vegetables, bread, etcetera, thereon while over a fire or heating element. At least two positions 62 are preferably positioned so that cooking grid 60 maintains a substantially parallel orientation relative to the ground when suspended at the at least two positions 62. As is shown in FIG. 4, cooking grid 60 may alternatively comprise three positions 62.

Upper linking member 64 of grill assembly 50 is shown in FIG. 4, among others, as comprising upper end 66 and lower end 68. Upper end 66 of upper linking member 64 is secured to pod directing bracket 56 and lower end 68 of upper linking member 64 is secured to upper fastener 48 of upper suspending member 42. Preferably, upper end 66 and lower end 68 comprise hooks 67 which are releasably securable to pod directing bracket 56 and upper fastener 48, however, other means of securement are also contemplated, such as, but not limited to, welding, fusing, tying, threaded and non-threaded fasteners, rivets, various tapes, and adhesives—just to name a few. As such, upper linking member 64 links vertical rotisserie sub-assembly 100 to pod directing bracket 56, substantially suspending vertical rotisserie sub-assembly 100 below pod directing bracket 56. As is shown in the figures, preferably, upper linking member 64 comprises a chain, however, it will be understood that any one of a number of different linking members known to those skilled in the art are also contemplated for use.

Lower linking member 70 of grill assembly 50 is shown in FIG. 4, among others, as comprising upper end 72 and lower end 74. Upper end 72 of lower linking member 70 is secured to lower fastener 40 of lower suspending member 36 and lower end 74 of lower linking member 70 is secured to at least two positions 62 of cooking grid 60. Preferably, upper end 72 and lower end 74 comprise hooks 73 which are releasably securable to lower fastener 40 and at least two positions 62, however, other means of securement are also contemplated, such as, but not limited to, welding, fusing, tying, threaded and non-threaded fasteners, rivets, various tapes, and adhesives—just to name a few. As such, lower linking member 70 secures cooking grid 60 to vertical rotisserie sub-assembly 100, substantially suspending cooking grid 60 below vertical rotisserie sub-assembly 100. As is shown in the figures, preferably, lower linking member 70 comprises a chain, however, it will be understood that any one of a number of different linking members known to those skilled in the art are also contemplated for use.

As is shown in FIGS. 7-10, collectively, vertical rotisserie sub-assembly 100 can also comprise mounting bracket 76, stem 78, and cooking grid adapter 84 for use in association with, for example, a grill assembly having a grill body or grill basin.

Mounting bracket 76 is secured to housing 10 of vertical rotisserie sub-assembly 100 and to a grill body, to, in turn, secure vertical rotisserie sub-assembly 100 to a grill body. As can be see in FIG. 9, among others, mounting bracket 76 is preferably releasably securable within at least one mounting slot 16 of first surface 12 of housing 10. Furthermore, as can be see in FIG. 8, mounting bracket 76 is preferably releasably securable to a grill body via at least one fastener 77. However, other means of securement are contemplated for use, including, but not limited to, welding, fusing, threaded and non-threaded fasteners, rivets, various tapes, and adhesives—just to name a few.

Stem 78 is shown in the figures as comprising lower end 80, upper end 82, and length 83. Lower end 80 of stem 78 is secured within slot 34 of rotating member 32 and aperture 14 of first surface 12 of housing 10. Upper end 82 is secured to cooking grid adapter 84. It is contemplated that length 83 ranges from approximately 1 centimeter (cm) to approximately 100 cm, however the length of stem 78 is not critical, as long as it extends from housing 10, positioned below a grill body, to a cooking grid positioned within and/or above a grill body. Preferably, at least a portion of an outer peripheral geometry of stem 78 is non-circular and may preferably comprise, for example, a substantially rectangular, substantially polygonal, substantially square, substantially oval, or substantially arbitrary outer peripheral geometry. It will be understood that the exact configuration of stem 78 is not critical, as long as stem 78 is able to be rotated by rotating member 32 while secured in slot 34. Stem 78 is preferably releasably secured within slot 34 of rotating member 32 and aperture 14 of first surface 12 of housing 10 by a buttonhead bolt, however other means of securing are also contemplated, such as, but not limited to, welding, fusing, threaded and non-threaded fasteners, rivets, various tapes, and adhesives—just to name a few.

Figure 9:
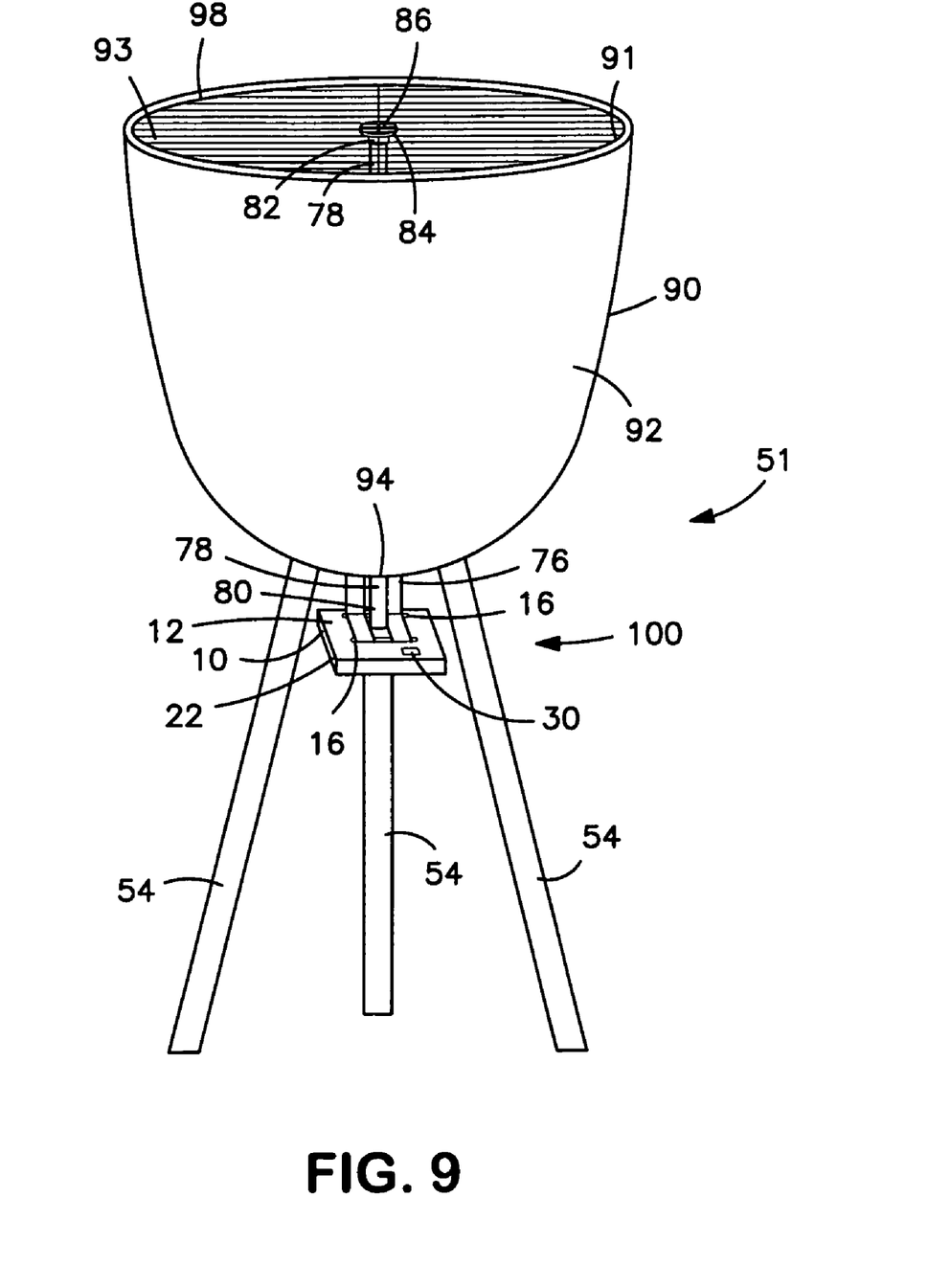
FIG. 9 of the drawings is a top perspective view of an embodiment of a vertical rotisserie sub-assembly showing, among other things, a grill assembly having a grill body, at least three ground engaging legs, and a cooking grid, fabricated in accordance with the present invention.
Figure 10:
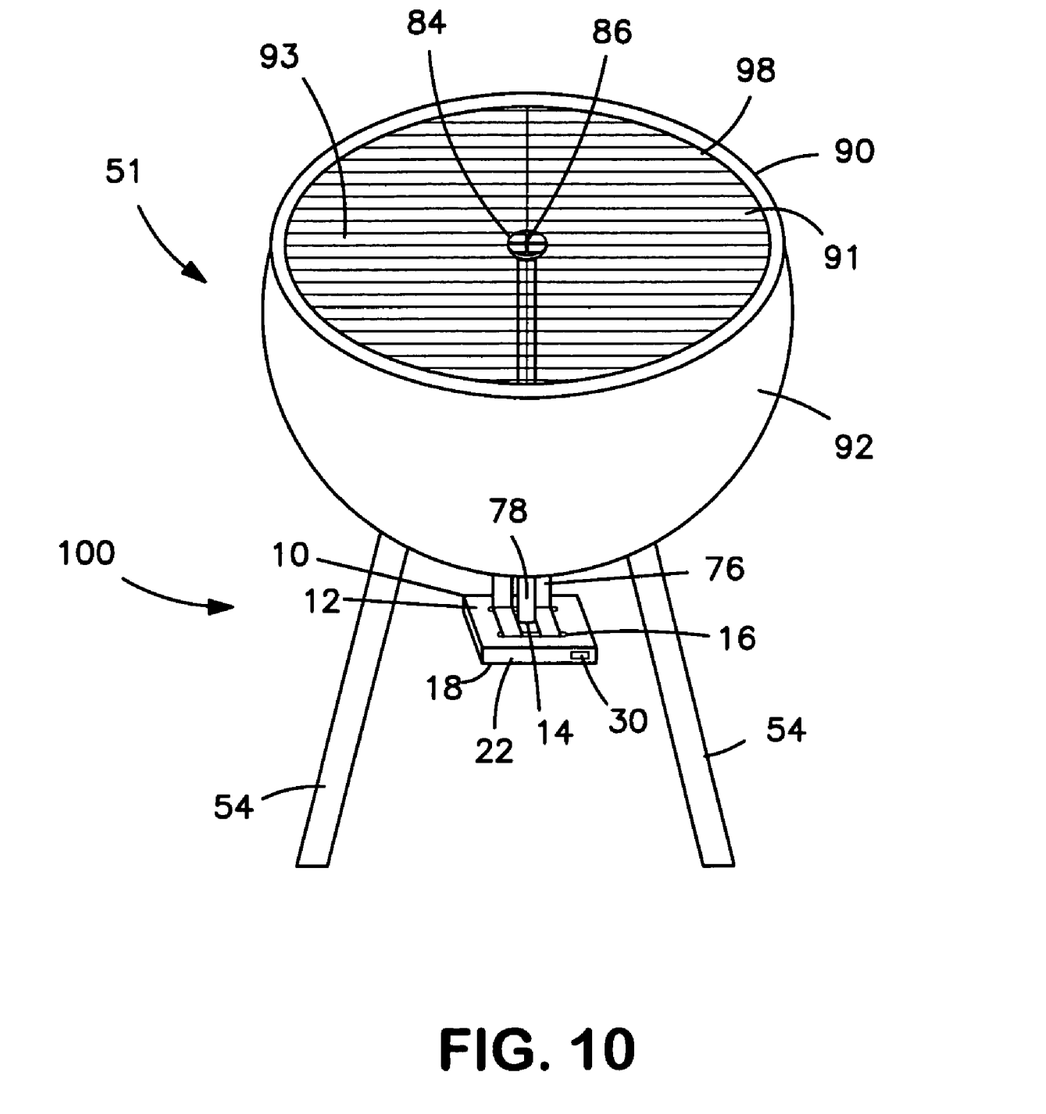
FIG. 10 of the drawings is a top perspective view of an embodiment of a vertical rotisserie sub-assembly showing, among other things, a grill assembly having a grill body, at least two ground engaging legs, and a cooking grid, fabricated in accordance with the present invention.

Cooking grid adapter 84 is shown in FIGS. 7-10, collectively, as comprising at least one channel 86. At least one channel 86 is configured to receive a portion of a cooking grid therein. Cooking grid adapter 84 may also comprise slot 88 for receiving upper end 82 of stem 78 for releasable securement thereto. Preferably, as is shown in FIG. 10, cooking grid adapter 84 comprises at least two channels 86 for receiving a portion of a cooking grid therein, and more preferably, cooking grid adapter 84 comprises at least two channels 86 which are substantially perpendicular to each other.

As can be seen in FIGS. 9 and 10, among others, vertical rotisserie sub-assembly 100 may further comprise grill assembly 51 comprising grill body 90, at least two ground engaging legs 54, and cooking grid 98. While grill assembly 50 is shown as comprising separate members comprising the same or different materials which are fused, welded, fastened, or otherwise attached, it will be understood that a unitary member is also contemplated for grill assembly 51. In addition, grill assembly 51, as well as its members, may be fabricated from any one of a number of materials including numerous metals and alloys, natural or synthetic plastics, woods, combinations of the same, etcetera, but should be at least partially heat resistant.

Grill body 90 comprises inner surface 91, outer surface 92, open fire chamber 93, which is defined by inner surface 91, and slot 94, which extends through inner surface 91 and outer surface 92 of grill body 90. As can be seen in FIGS. 9 and 10, preferably, grill body 90 comprises a substantially basin/bowl configuration. In this embodiment, outer surface 92 is secured to mounting bracket 76 to secure housing 10 to grill assembly 51. Furthermore, in this embodiment, stem 78 is positioned through slot 94 such that at least a portion of length 83 of stem 78 is positioned within open fire chamber 93 of grill body 90.

At least two ground engaging legs 54 are secured to outer surface 92 of grill body 90 and may be associated with wheels. Preferably, at least two ground engaging legs 54 comprise at least three ground engaging legs.

Cooking grid 98 is configured to retain food, such as meat, vegetables, bread, etcetera, while being grilled. Cooking grid 98 is secured to inner surface 91 of grill body 90 in a substantially horizontal orientation, and may be at least partially contained within open fire chamber 93 of grill body 90.

In operation, when vertical rotisserie sub-assembly 100 is utilized with a grill assembly, such as grill assembly 50, over an open fire, housing 10 is suspended below pod directing bracket 56 by upper linking member 64. Cooking grid 60 is suspended in a horizontal orientation, so as to support a variety of food items thereon, below housing 10 using lower linking member 70. Switch 30 is turned on by a user, which actuates at least one of motor 26 and energy source 28 to, in turn, actuate rotation of rotating member 32. Rotating member 32 rotates stem 38, in slot 34 of rotating member 32, in a horizontal orientation, which in turn rotates lower fastener 40, lower linking member 70, and cooking grid 60 in a horizontal orientation, inasmuch as they are all secured together. As such, food items retained on cooking grid 60 are rotated in a substantially horizontal orientation above a fire or heating element, thereby receiving substantially more uniform heating.

In operation, when vertical rotisserie sub-assembly 100 is utilized with a grill assembly having a grill body, such as grill assembly 51, housing 10 is secured to outer surface 92 of grill body 90 via mounting bracket 76. Stem 78 is secured within slot 34 of rotating member 32 and extends through slot 94 and into open fire chamber 93 of grill body 90. Cooking grid adapter 84 is secured to upper end 82 of stem 78 and to cooking grid 98. Switch 30 is turned on by a user, which actuates at least one of motor 26 and energy source 28 to, in turn, actuate rotation of rotating member 32. Rotating member 32 rotates stem 78, in slot 34 of rotating member 32, in a horizontal orientation, which in turn rotates cooking grid adapter 84 and cooking grid 98 in a horizontal orientation, inasmuch as they are all secured together. As such, food items retained on cooking grid 98 are rotated in a substantially horizontal orientation above a fire or heating element, thereby receiving substantially more uniform heating.

Therefore, while conventional grilling surfaces remain stationary and acquire hot and cold spots thereon due to the inconsistent heat and/or intensity of the fire or heating element below, vertical rotisserie sub-assembly 100 facilitates substantially more uniform heating of food over a fire or heating element by rotating the food at a desired and/or constant speed over the fire or heating element. As such, food grilled with vertical rotisserie sub-assembly 100 in association with a grill assembly will be more evenly cooked, resulting in a more satisfactory grilling experience.

In addition, because vertical rotisserie sub-assembly 100 comprises a plurality of members, preferably releasably secured to each other, vertical rotisserie sub-assembly 100 is easily adaptable to be utilized with a variety of grill assemblies, including grills comprising multi-pod configurations and grills comprising grill bodies or basins.

The foregoing description merely explains and illustrates the invention and the invention is not limited thereto except insofar as the appended claims are so limited, as those skilled in the art who have the disclosure before them will be able to make modifications without departing the scope of the invention.

What is claimed is:

1. A vertical rotisserie sub-assembly, comprising;
a housing, wherein the housing comprises:
    a first surface, wherein the first surface comprises an aperture;
    a second surface;
    at least one sidewall; and
    an internal chamber defined by the first surface, the second surface, and the at least one sidewall of the housing;
a motor, wherein the motor is contained within the internal chamber of the housing;
an energy source, wherein the energy source is contained within the internal chamber of the housing, and wherein the energy source provides energy to the motor;
a switch, wherein the switch is at least partially contained within the internal chamber of the housing, and further wherein the switch is in electrical communication with at least one of the motor and the energy source;
a rotating member, wherein the rotating member is at least partially contained within the internal chamber of the housing, and wherein the rotating member is in mechanical communication with the motor, and further wherein the rotating member comprises a slot;
a lower suspending member, wherein the lower suspending member is capable of suspending a cooking grid below the first surface of the housing, and wherein the lower suspending member comprises:
    a stem, wherein the stem of the lower suspending member is secured within the slot of the rotating member and the aperture of the first surface of the housing; and
    a lower fastener; and
an upper suspending member, wherein the upper suspending member is capable of suspending the housing below a grill assembly, and wherein the upper suspending member comprises:
    a bracket member, wherein the bracket member of the upper suspending member is secured to the second surface of the housing; and
    an upper fastener.

2. The vertical rotisserie sub-assembly according to claim 1, wherein the second surface of the housing comprises at least two apertures, and further wherein the bracket member comprises a C-shaped bracket and at least two fasteners releasably secured within the at least two apertures of the second surface of the housing.

3. The vertical rotisserie sub-assembly according to claim 1, wherein the housing comprises four sidewalls.

4. The vertical rotisserie sub-assembly according to claim 1, wherein at least a portion of the switch is positioned on one of the first surface, the second surface, and the at least one sidewall.

5. The vertical rotisserie sub-assembly according to claim 1, wherein at least one of the lower fastener and the upper fastener comprises an eyebolt.

6. The vertical rotisserie sub-assembly according to claim 1, wherein the stem comprises a non-circular outer peripheral geometry.

7. The vertical rotisserie sub-assembly according to claim 1, wherein the stem of the lower suspending member is releasably secured within the slot of the rotating member and the aperture of the first surface of the housing.

8. The vertical rotisserie sub-assembly according to claim 1, wherein the vertical rotisserie sub-assembly further comprises a grill assembly, wherein the grill assembly comprises:
    a multi-pod, wherein the multi-pod comprises at least two ground engaging legs;
    a pod directing bracket, wherein the pod directing bracket comprises at least two apertures for receiving the at least two ground engaging legs of the multi-pod therein;
    a cooking grid, wherein the cooking grid comprises at least two positions;
    an upper linking member, wherein the upper linking member comprises an upper end and a lower end, and wherein the upper end of the upper linking member is secured to the pod directing bracket and the lower end of the upper linking member is secured to the upper fastener of the upper suspending member; and
    a lower linking member, wherein the lower linking member comprises an upper end and a lower end, and wherein the upper end of the lower linking member is secured to the lower fastener of the lower suspending member and the lower end of the lower linking member is secured to the at least two positions of the cooking grid.

9. The vertical rotisserie sub-assembly according to claim 8, wherein the multi-pod comprises at least three ground engaging legs, and wherein the pod directing bracket comprises at least three apertures for receiving the at least three ground engaging legs of the multi-pod therein.

10. The vertical rotisserie sub-assembly according to claim 8, wherein the cooking grid comprises at least three positions, and wherein the lower end of the lower linking member is secured to the at least three positions of the cooking grid.

11. A vertical rotisserie sub-assembly, comprising;
a housing, wherein the housing comprises:
    a first surface, wherein the first surface comprises an aperture and at least one mounting slot;
    a second surface;
    at least one sidewall; and
    an internal chamber defined by the first surface, the second surface, and the at least one sidewall of the housing;
a mounting bracket, wherein the mounting bracket is secured within the at least one mounting slot of the first surface of the housing, and further wherein the mounting bracket is securable to a grill assembly to, in turn, secure the housing thereto;
a motor, wherein the motor is contained within the internal chamber of the housing;
an energy source, wherein the energy source is contained within the internal chamber of the housing, and wherein the energy source provides energy to the motor;
a switch, wherein the switch is at least partially contained within the internal chamber of the housing, and further wherein the switch is in electrical communication with at least one of the motor and the energy source;
a rotating member, wherein the rotating member is at least partially contained within the internal chamber of the housing, and wherein the rotating member is in mechanical communication with the motor, and further wherein the rotating member comprises a slot;
a stem, wherein the stem comprises an upper end and a lower end, and wherein the lower end of the stem is secured within the slot of the rotating member and the aperture of the first surface of the housing; and
a cooking grid adapter, wherein the cooking grid adapter comprises at least one channel for receiving a portion of a cooking grid therein, and wherein the cooking grid adapter is secured to the upper end of the stem.

12. The vertical rotisserie sub-assembly according to claim 11, wherein the housing comprises four sidewalls.

13. The vertical rotisserie sub-assembly according to claim 11, wherein at least a portion of the switch is positioned on one of the first surface, the second surface, and the at least one sidewall.

14. The vertical rotisserie sub-assembly according to claim 11, wherein the stem comprises a non-circular outer peripheral geometry.

15. The vertical rotisserie sub-assembly according to claim 11, wherein the lower end of the stem is releasably secured within the slot of the rotating member and the aperture of the first surface of the housing.

16. The vertical rotisserie sub-assembly according to claim 11, wherein the cooking grid adapter comprises a slot for receiving the upper end of the stem to, in turn, releasably secure the cooking grid adapter to the upper end of the stem.

17. The vertical rotisserie sub-assembly according to claim 11, wherein the cooking grid adapter comprises at least two channels for receiving a portion of a cooking grid therein.

18. The vertical rotisserie sub-assembly according to claim 17, wherein at least two of the at least two channels of the cooking grid adapter are substantially perpendicular to each other.

19. The vertical rotisserie sub-assembly according to claim 11, wherein the vertical rotisserie sub-assembly further comprises a grill assembly, wherein the grill assembly comprises:
   a grill body, wherein the grill body comprises:
      an inner surface;
      an outer surface, wherein the outer surface of the grill body is secured to the mounting bracket of the vertical rotisserie sub-assembly;
      an open fire chamber defined by the inner surface of the grill body; and
      at least one slot extending through the inner surface and the outer surface of the grill body;
   at least two ground engaging legs, wherein the at least two ground engaging legs are secured to the outer surface of the grill body; and
   a cooking grid, wherein the cooking grid is secured to the inner surface of the grill body, and wherein the cooking grid is at least partially contained within the open fire chamber.

20. The vertical rotisserie sub-assembly according to claim 19, wherein the at least two ground engaging legs comprise at least three ground engaging legs.

* * * * *